(12) United States Patent
Thayer

(10) Patent No.: US 10,718,130 B2
(45) Date of Patent: Jul. 21, 2020

(54) BLIND ASSEMBLY

(71) Applicant: FadeOut, LLC, Grand Rapids, MI (US)

(72) Inventor: Matthew Thayer, Grand Rapids, MI (US)

(73) Assignee: FadeOut LLC, Grand Rapids, MI (US)

( * ) Notice: Subject to any disclaimer, the term of this patent is extended or adjusted under 35 U.S.C. 154(b) by 60 days.

(21) Appl. No.: 15/974,208

(22) Filed: May 8, 2018

(65) Prior Publication Data

US 2018/0334829 A1 Nov. 22, 2018

Related U.S. Application Data

(60) Provisional application No. 62/507,524, filed on May 17, 2017.

(51) Int. Cl.
| | |
|---|---|
| *E04H 15/00* | (2006.01) |
| *A01M 31/02* | (2006.01) |
| *E04H 15/64* | (2006.01) |
| *E04H 15/04* | (2006.01) |

(52) U.S. Cl.
CPC ......... *E04H 15/001* (2013.01); *A01M 31/025* (2013.01); *E04H 15/005* (2013.01); *E04H 15/64* (2013.01); *E04H 15/04* (2013.01)

(58) Field of Classification Search
CPC .... E04H 15/001; E04H 15/005; A01M 31/00; A01M 31/025
See application file for complete search history.

(56) References Cited

U.S. PATENT DOCUMENTS

| | | | |
|---|---|---|---|
| 851,141 A * | 4/1907 | Stempel | E04H 15/16 135/94 |
| 2,784,779 A * | 3/1957 | Knipfer | E04H 15/003 160/135 |
| 3,052,054 A * | 9/1962 | Littleton et al. | 43/1 |
| 3,442,275 A * | 5/1969 | Ternes | A01M 31/00 135/87 |
| 4,473,087 A | 9/1984 | Cavender | |
| 4,951,696 A | 8/1990 | Jones, Sr. | |
| 5,062,234 A | 11/1991 | Green | |

(Continued)

OTHER PUBLICATIONS

'Primos UpnDown Staeout Adjsutable Blind' Aug. 21, 2012 [online] <URL: https://www.youtube.com/watch?v=DbW2U7PpAJ4> entire video (Year: 2012).*

(Continued)

*Primary Examiner* — David R Dunn
*Assistant Examiner* — Danielle Jackson
(74) *Attorney, Agent, or Firm* — Harness, Dickey & Pierce, P.L.C.

(57) ABSTRACT

A blind assembly may include a panel member having an upper portion, an attachment member, and a first cord having a first end and a second end. The attachment member may be attached to the panel member at the upper portion thereof. The first end of the first cord is attached to the attachment member at the upper portion of the panel member and the second end is configured to be attached to a first stake positioned in a ground surface. A pathway is formed at the upper portion of the panel member once the first end of the first cord is attached to the attachment member and the second end of the first cord is attached to the first stake.

34 Claims, 11 Drawing Sheets

(56) References Cited

U.S. PATENT DOCUMENTS

| | | | |
|---|---|---|---|
| 5,628,338 A | 5/1997 | Stumbo | |
| 6,286,269 B1 | 9/2001 | Marcum | |
| 6,779,537 B1* | 8/2004 | Miller | A01M 31/00 |
| | | | 135/117 |
| 6,942,065 B1 | 9/2005 | Price | |
| 7,588,123 B2 | 9/2009 | Woller et al. | |
| 8,579,007 B2 | 11/2013 | Pottmeyer et al. | |
| 2003/0116183 A1* | 6/2003 | Hill | A01M 31/02 |
| | | | 135/90 |
| 2007/0251561 A1 | 11/2007 | Lee | |
| 2011/0079257 A1* | 4/2011 | Slinkard | A01M 31/025 |
| | | | 135/96 |
| 2012/0012142 A1* | 1/2012 | Frady | E04H 15/001 |
| | | | 135/90 |
| 2014/0020726 A1* | 1/2014 | Nolz | F41A 23/14 |
| | | | 135/144 |
| 2016/0368249 A1* | 12/2016 | Schwab | B32B 7/05 |
| 2017/0096833 A1* | 4/2017 | Colbeck | E04H 15/58 |
| 2017/0196216 A1* | 7/2017 | Pichik | A01M 31/00 |
| 2017/0362849 A1* | 12/2017 | Munnerlyn | E04H 15/005 |
| 2018/0064096 A1* | 3/2018 | Kruska | A01M 31/025 |

OTHER PUBLICATIONS

'Primos Up-N-Down Stakeout Ground Blind' [online] <URL: https://zestamarket.com/products/primos-up-n-down-stakeout-adjustable-ground-blind?gclid=EAlaIQobChMl2r_7qdLd5AlVyZ-zCh34tgwtEAQYBSABEgKxzPD_BwE> entire document.*

'Primos Up-N-Down Stakeout Adjustable Ground Blind' [online] <URL: https://www.amazon.com/gp/product/B00AN0V2WC?tag=s4343sdfd-20> entire document.*

* cited by examiner

BLIND ASSEMBLY

CROSS-REFERENCE TO RELATED APPLICATIONS

This application claims the benefit of U.S. Provisional Application No. 62/507,524, filed on May 17, 2017. The entire disclosure of the above application is incorporated herein by reference.

FIELD

The present disclosure relates to a blind assembly.

BACKGROUND

This section provides background information related to the present disclosure which is not necessarily prior art.

Blind assemblies are used to camouflage and/or conceal someone or something from a target, such as for surveillance or hunting game animals. Conventional blind assemblies are often heavy and difficult to transport from one location to another. Conventional blind assemblies are also not adaptable to poor conditions (wind or rain, for example).

The blind assembly of the present disclosure is adaptable to poor conditions and allows convenient transport of the blind assembly from one site to another.

SUMMARY

This section provides a general summary of the disclosure, and is not a comprehensive disclosure of its full scope or all of its features.

In one form, a blind assembly is extended around support structures and includes a panel member having an upper portion, an attachment member, and a first cord having a first end and a second end. The attachment member is attached to the panel member at the upper portion. The first end of the first cord is attached to the attachment member at the upper portion of the panel member and the second end of the first cord is configured to be attached to a first stake positioned in a ground surface. A pathway is formed at the upper portion of the panel member once the first end of the first cord is attached to the attachment member and the second end of the first cord is attached to the first stake.

In some configurations, a plurality of first webbings are attached to a first end of the panel member and a plurality of second webbings are attached to a second end of the panel member.

In some configurations, a plurality of second cords have a first end and a second end. The first end of the plurality of second cords is attached to a corresponding first webbing of the plurality of first webbings and the second end of the plurality of second cords is configured to be attached to a second stake positioned in the ground surface.

In some configurations, a plurality of third cords have a first end and a second end. The first end of the plurality of third cords is attached to a corresponding second webbing of the plurality of second webbings and the second end of the plurality of third cords is configured to be attached to a third stake positioned in the ground surface.

In some configurations, the pathway formed at the upper portion of the panel member is arcuate.

In some configurations, the panel member is adjustable between a first position and a second position.

In some configurations, the panel member is adjustable to a plurality of positions between the first position and the second position.

In some configurations, a pair of catch mechanisms are configured to attach to a corresponding support structure.

In some configurations, the panel member includes a hem that extends around a periphery thereof, and wherein the hem hooks onto the pair of catch mechanisms to facilitate the panel member grip with the support structures.

In some configurations, the panel member is one of a spandex and an elastane material.

In some configurations, the panel member is allowed to extend between 1% to 155% of the panel member steady state size.

In some configurations, a rod attachment is attached to the hem such that the rod attachment and the hem cooperate to form an opening that is configured to receive a hunting rod.

In some configurations, a plurality of first buckle assemblies are attached to a first end of the panel member and a plurality of second buckle assemblies are attached to a second end of the panel member, the plurality of first and second buckle assemblies are configured to be attached to first and second stakes positioned in a ground surface, In another form, the blind assembly includes a pair of support structures, a panel member extending around the pair of support structures and having an upper portion, an attachment member, and a first cord having a first end and a second end. The attachment member is attached to the panel member at the upper portion. The first end of the first cord is attached to the attachment member at the upper portion of the panel member and the second end of the first cord is configured to be attached to a first stake positioned in a ground surface. The panel member is adjustable between a first position and a second position. A pathway is formed at the upper portion of the panel member once the first end of the first cord is attached to the attachment member and the second end of the first cord is attached to the first stake.

In some configurations, the panel member assumes the natural shape of the pair of support structures once the panel member extends around the pair of support structures.

In some configurations, the panel member is extended around the pair of support structures by stretching the panel member around the pair of support structures to facilitate grip between the panel member and the pair of support structures.

In some configurations, the panel member is extended around the support structures to form a first panel section, a second panel section and a third panel section.

In some configurations, a first fastening member is attached to the first panel section and a second fastening member is attached to the third panel section. The first and second fastening members each include a first snap member and a second snap member.

In some configurations, the first snap member is attached near an upper portion of the panel member and the second snap member is attached near a lower portion of the panel member. The first snap member is fastened to the second snap member to increase the rigidity of the first and third panel sections.

In yet another form, the blind assembly includes a support structure, a catch mechanism, a panel member, and a plurality of first and second buckle assemblies. The catch mechanism is attached to the support structure. The panel member extends around the support structure and the catch mechanism. The plurality of first buckle assemblies are attached to a first end of the panel member and the plurality of second buckle assemblies are attached to a second end of the panel member. The plurality of first and second buckle assemblies are configured to be attached to first and second stakes positioned in a ground surface. The panel member is adjustable between a first and second position along the support structure.

In yet another form, the present disclosure provides a method for installing the blind. The method includes attaching a first end of a plurality of first cords to a first end of a panel member; attaching a first end of a plurality of second cords to a second end of the panel member; extending the first end of the panel member around a first support structure and coupling a second end of the plurality of first cords to a first stake positioned in a ground surface; extending the second end of the panel member around a second support structure and coupling a second end of the plurality of second cords to a second stake positioned in the ground surface; attaching a first end of a third cord to an attachment member attached at an upper portion of the panel member and coupling a second end of the third cord to a third stake positioned in the ground surface; and setting the panel member to one of a first position and a second position.

In some configurations, the panel member is one of a spandex and elastane material.

In some configurations, a pathway is formed in the upper portion of the panel member once the second end of the third cord is attached to the third stake positioned in the ground surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
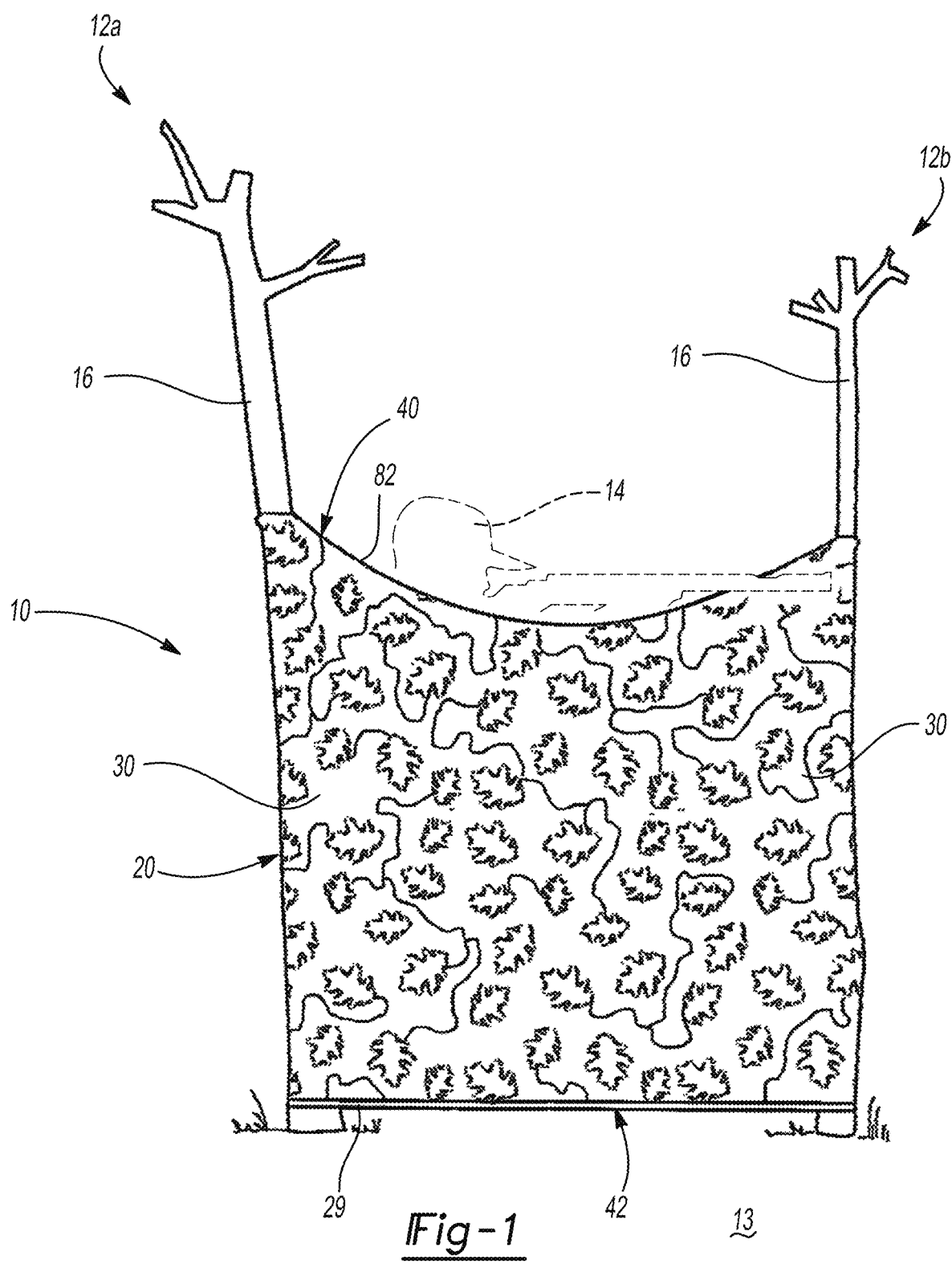
FIG. 1 is a front view of the blind assembly in a first position according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-9, a blind assembly 10 is provided. The blind assembly 10 is extended around first and second support members or structures 12a, 12b and attached to a ground surface 13 so that a user 14 may be concealed and/or camouflaged at the site when surveilling a person or location, or hunting game animals. As will be described more in detail below, the blind assembly 10 may be adjustable relative to the first and second support structures 12a, 12b and the ground surface 13 between a first position (FIGS. 1, 4 and 5) in which the blind assembly 10 is situated near an upper portion 16 of the first and second support structures 12a, 12b and a second position (FIG. 6) in which the blind assembly 10 is situated at or near a lower portion 18 of the first and second support structurers 12a, 12b.

The blind assembly 10 includes a panel member 20, a plurality of first webbing loops 21, a plurality of second webbing loops 22, a third webbing loop or attachment member 23, a plurality of first cords 24, a plurality of second cords 25, a third cord 26, and first and second catch mechanisms 28a, 28b (together known as the pair of catch mechanisms 28).

The panel member 20 has a rectangular shape (FIGS. 2 and 3) and may be made of a spandex or elastane material similar to Lycra®, Elaspan®, or Acepora®, for example. The spandex or elastane material allows for the panel member 20 to extend around the first and second support structures 12a, 12b by stretching the panel member 20 around the first and second support structures 12a, 12b such that the panel member 20 grips the first and second support structures 12a, 12b and assumes or mimics the shape of the first and second support structures 12a, 12b for a more natural appearance of the surveillance or hunting site. This also reduces movement of the panel member 20 when using it in windy conditions, for example, thereby eliminating sounds that would otherwise alert a surveillance target or alarm or scare off game animals. The panel member 20 may stretch between 1% to 155% of its original steady state size so that the panel member 20 conveniently extends around the first and second support structures 12a, 12b. In some configurations, the panel member 20 may be a rigid, unstretchable material. The panel member 20 may also be a trapezoidal, pentagonal, or other suitable shape that gives a natural appearance of the surveillance or hunting site once extended around the first and second support structures 12a, 12b. A one-inch thick hem 29 may be sewn around a periphery of the panel member 20 so as to facilitate the panel member 20 grip with the first and second support structures 12a, 12b and the first and second catch mechanisms 28a, 28b.

The panel member 20 includes a first side 30 and a second side 32. The first side 30 is camouflaged so as to give the natural appearance of the surveillance or hunting site to targets or game animals once the panel member 20 is extended around the first and second support structures 12a, 12b. The second side 32 is opposite the first side 30 and may be a camouflage or neutral color such as olive, for example, so as to give the natural appearance of the surveillance or hunting site to targets or game animals.

The plurality of first webbing loops 21 may be made out of nylon material and attached (i.e., sewn) to a first end 38 of the panel member 20. As shown in FIGS. 2-6, the plurality of first webbing loops 21 include an upper webbing loop 21a, a an intermediate webbing loop 21b, and a lower webbing loop 21c. The upper webbing loop 21a is positioned at an upper portion 40 of the panel member 20. The lower webbing loop 21c is positioned at a lower portion 42 of the panel member 20. The intermediate webbing loop 21b is positioned at an intermediate portion of the panel member 20 between the upper webbing loop 21a and the lower webbing loop 21c.

Figure 2:
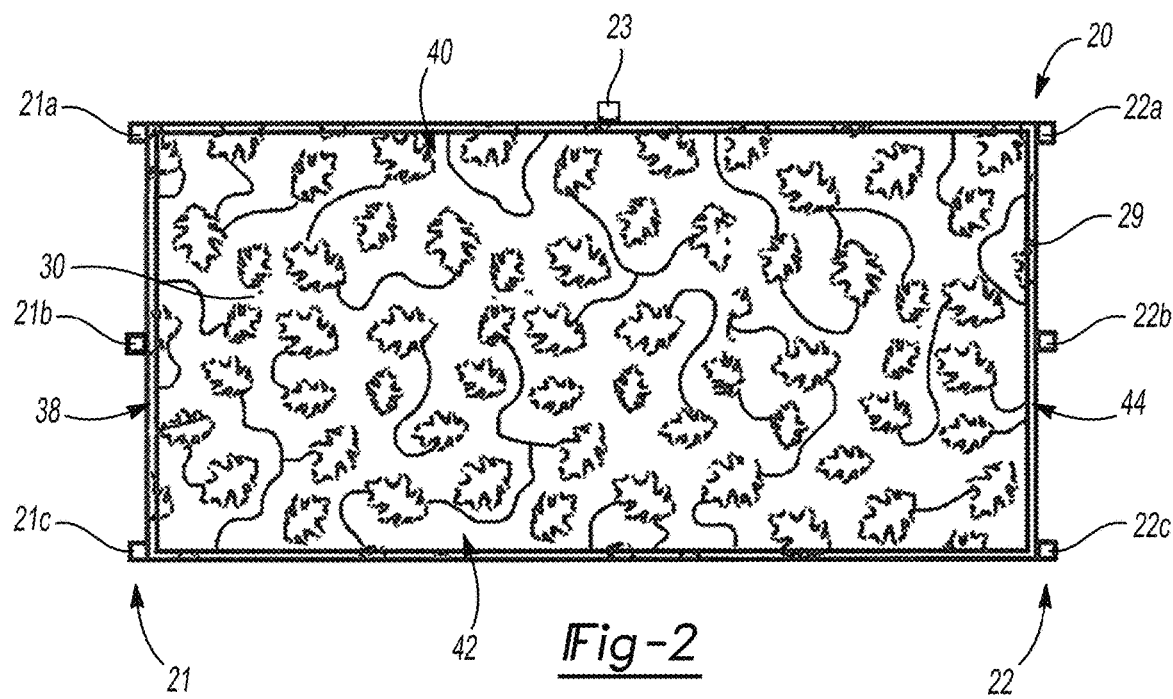
FIG. 2 is a front view of a panel member of the blind assembly shown in FIG. 1.
Figure 3:
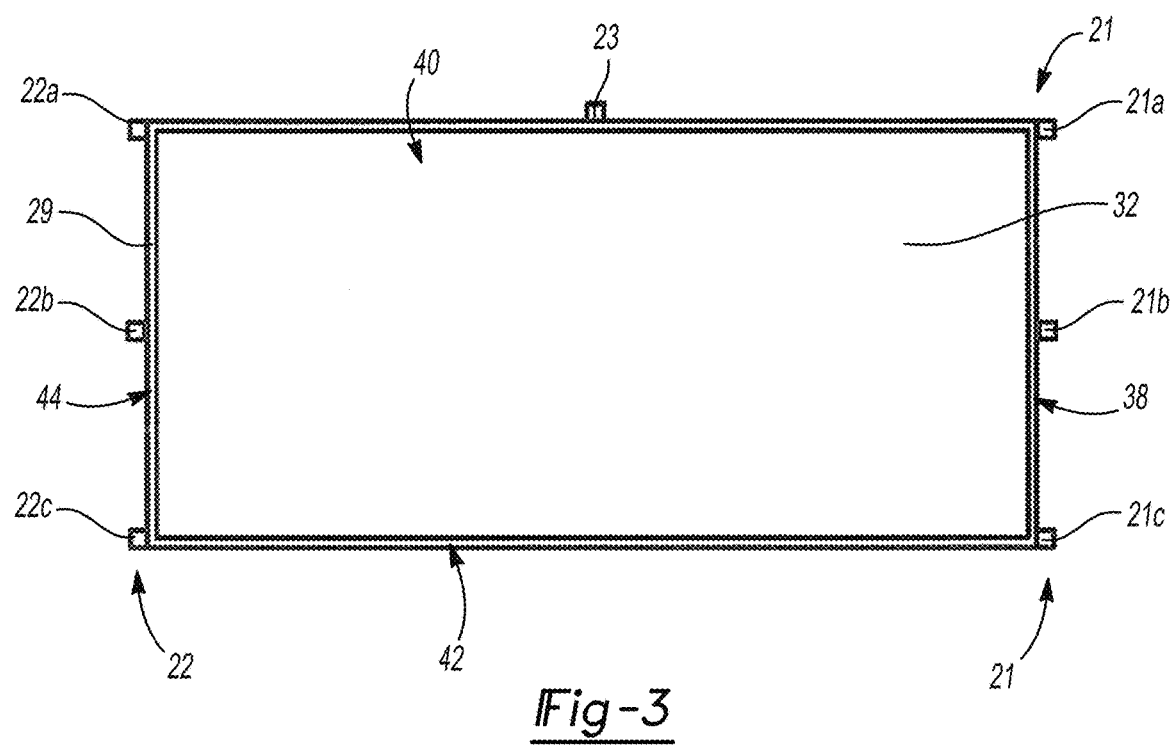
FIG. 3 is a back view of the panel member of the blind assembly shown in FIG. 1.

The plurality of second webbing loops 22 may be made out of nylon material and attached (i.e., sewn) to a second end 44 of the panel member 20. As shown in FIGS. 2-6, the plurality of second webbing loops 22 include an upper webbing loop 22a, an intermediate webbing loop 22b, and a lower webbing loop 22c. The upper webbing loop 22a is positioned at the upper portion 40 of the panel member 20. The lower webbing loop 22c is positioned at the lower portion 42 of the panel member 20. The intermediate webbing loop 22b is positioned at the intermediate portion of the panel member 20 between the upper webbing loop 22a and the lower webbing loop 22c. The third webbing loop 23 may be made out of nylon material and attached (i.e., sewn) at the upper portion 40 of the panel member 20 between the upper webbing loop 21a and the upper webbing loop 22a (FIGS. 2 and 3).

Each first cord 24 may be made out of an elastic material and include a body 46 having a first end 48 and a second end 50. The first end 48 of each first cord 24 is attached to a corresponding first webbing loop 21a, 21b, 21c. The first end 48 of each first cord 24 may be integrally attached to the corresponding first webbing loop 21a, 21b, 21c of the panel member 20. The second end 50 of each first cord 24 is integrally attached to a first hooking member 52 that is configured to be coupled to a U-shaped first stake 54 positioned in the ground surface 13. In some configurations, the second end 50 of each first cord 24 may be attached to a separate hooking member (not shown), which, in turn, may be coupled to a corresponding stake (not shown) positioned in the ground surface 13.

Each second cord 25 may be made out of an elastic material and include a body 56 having a first end 58 and a second end 60. The first end 58 of each second cord 25 is attached to a corresponding second webbing loop 22a, 22b, 22c of the panel member 20. The first end 58 of each second cord 25 may be integrally attached to the corresponding second webbing loop 22a, 22b, 22c. The second end 60 of each second cord 25 is integrally attached to a second hooking member 62 that is configured to be attached to a second U-shaped stake 64 positioned in the ground surface 13. In some configurations, the second end 60 of each second cord 25 may be attached to a separate hooking member (not shown), which, in turn, may be coupled to a corresponding stake (not shown) positioned in the ground surface 13.

The third cord 26 is made out of an elastic material. The third cord 26 may also include a body 66 having a first end 68 and a second end 70. The first end 68 of the third cord 26 is attached to the third webbing loop 23 of the panel member 20. In some configurations, the first end 68 of the third cord 26 may be integrally attached to the third webbing loop 23.

The second end 70 of the third cord 26 is integrally attached to a third hooking member 72 that is configured to be coupled to a third U-shaped stake 74 positioned in the ground surface 13.

Figure 3A:
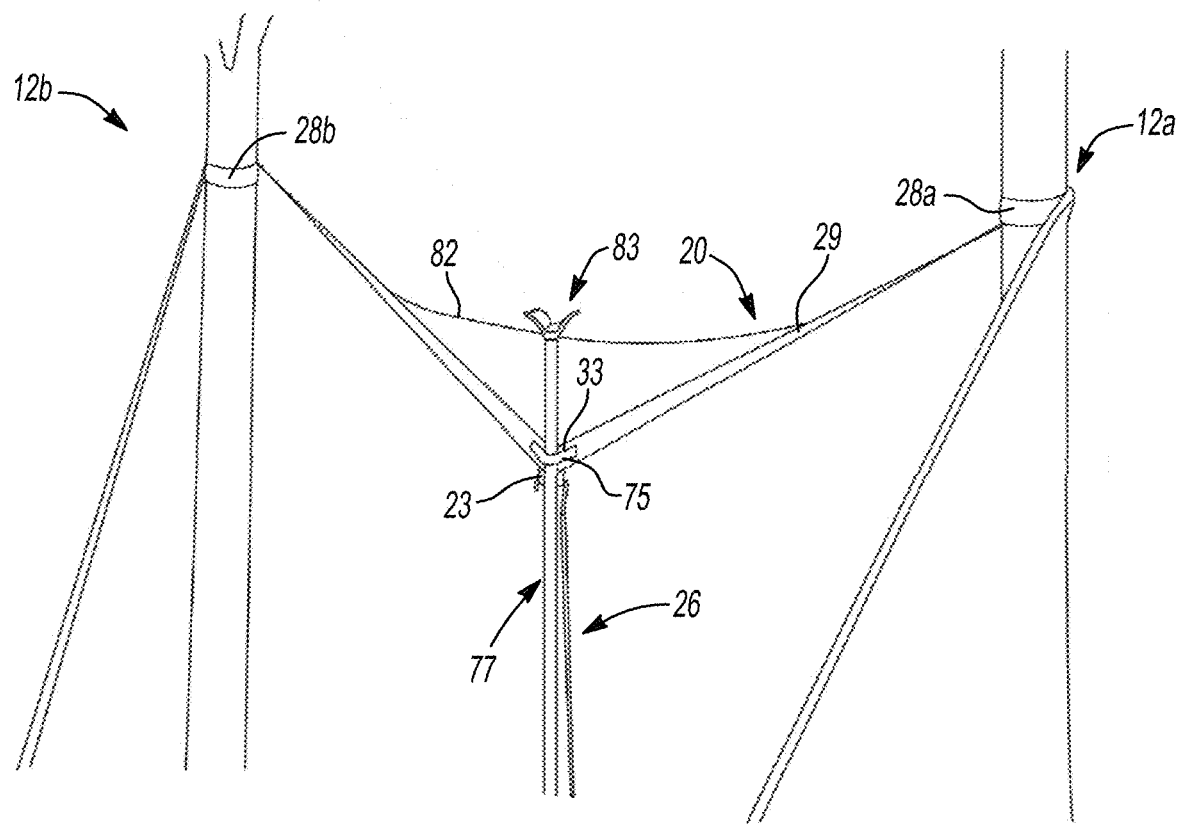
FIG. 3a is a back view of an alternate panel member of the blind assembly shown in FIG. 1.

In some configurations, as shown in FIG. 3a, a fourth webbing loop or hunting rod attachment 75 is attached (i.e., sewn) onto the hem 29 above the third webbing loop 23 such that the rod attachment 75 and the hem 29 cooperate to form an opening 33 that accommodates a hunting rod 77 having a platform 83 (FIG. 3a). In such configuration, once the blind assembly 10 is installed at the site, the hunting rod 77 is inserted through the opening 33 to facilitate support and aim of the hunting tool (e.g., firearm). The rod attachment 75 holds the hunting rod 77 in a set position so that the user 14 does not have to hold or move the hunting rod 77 into the set position when a game animal, for example, appears.

Figure 7:
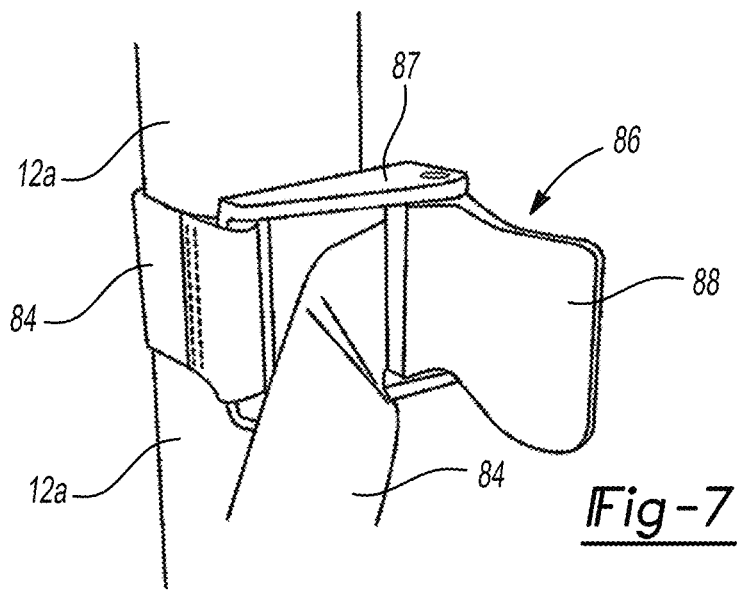
FIG. 7 is a front view of a catch mechanism of the blind assembly shown in FIG. 1 in an unlocked position.
Figure 8:
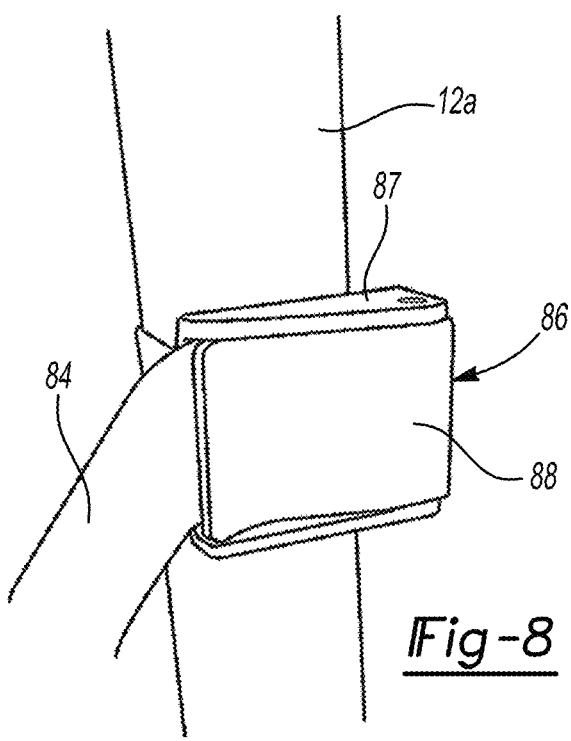
FIG. 8 is a front view of the catch mechanism of the blind assembly shown in FIG. 1 in a locked position.
Figure 9:
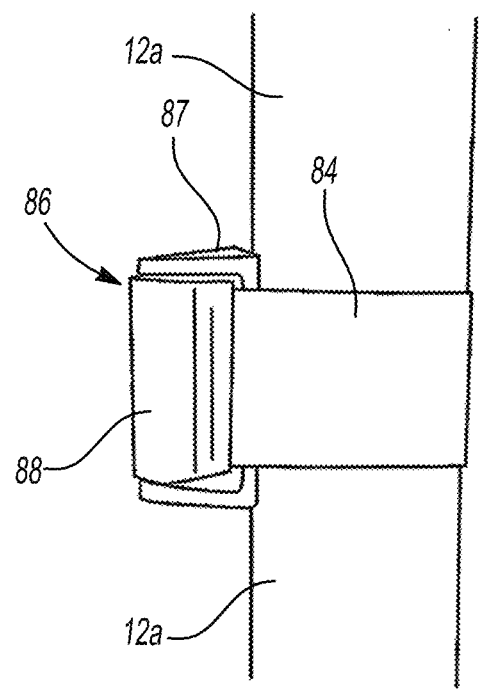
FIG. 9 is a side view of the catch mechanism of the blind assembly shown in FIG. 1 in the locked position.

Each catch mechanism 28a, 28b is attached to a corresponding first and second support structures 12a, 12b such that the hem 29 sewn into the panel member 20 hooks on to the pair of catch mechanisms 28 once the panel member 20 is extended around the first and second support structures 12a, 12b and the pair of catch mechanisms 28, thereby further facilitating the grip between the panel member 20 and the first and second support structures 12a, 12b. With reference to FIGS. 7-9, catch mechanism 28a of the pair of catch mechanism 28 is shown attached to the support structure 12a. It should be understood that catch mechanism 28b of the pair of catch mechanisms 28 is attached to the support structure 12b in a similar or identical fashion, as described herein.

Each catch mechanism 28a, 28b includes a strap 84 and a cam buckle 86. The strap 84 may be made out of a nylon or polypropylene webbing material, for example, and is configured to wrap around the support structure 12a. The cam buckle 86 may be made out of a polypropylene material, for example, and includes a body 87 and a handle 88 that cooperate to form an opening (not shown) in the cam buckle 86. The handle 88 is movable between an unlocked position (FIG. 7) and a locked position (FIGS. 8 and 9). The strap 84 is fed through the opening (not shown) in the cam buckle 86 as it wraps around the support structure 12a and the handle 88 is in the unlocked position. Once the strap 84 is securely wrapped around the support structure 12a, the cam buckle 86 is moved from the unlocked position to the locked position, thereby, securing the catch mechanism 28a to the supporting structure 12a (FIGS. 8 and 9). It should be understood that the pair of catch mechanism 28 may include a hook and loop mechanism (not shown), a snap button system (not shown), or a bungee ball assembly (not shown) instead of the strap 84 and the cam buckle 86 described above.

The first and second support structures 12a, 12b in the present disclosure are trees that may be present at the surveillance or hunting site, which facilitates stability of the panel member 20 and also reduces the amount of equipment that needs to be carried out to the site by the user 14. It should be understood that rods (not shown) may also be used as support members to install the blind assembly 10 at the site.

Figure 4:
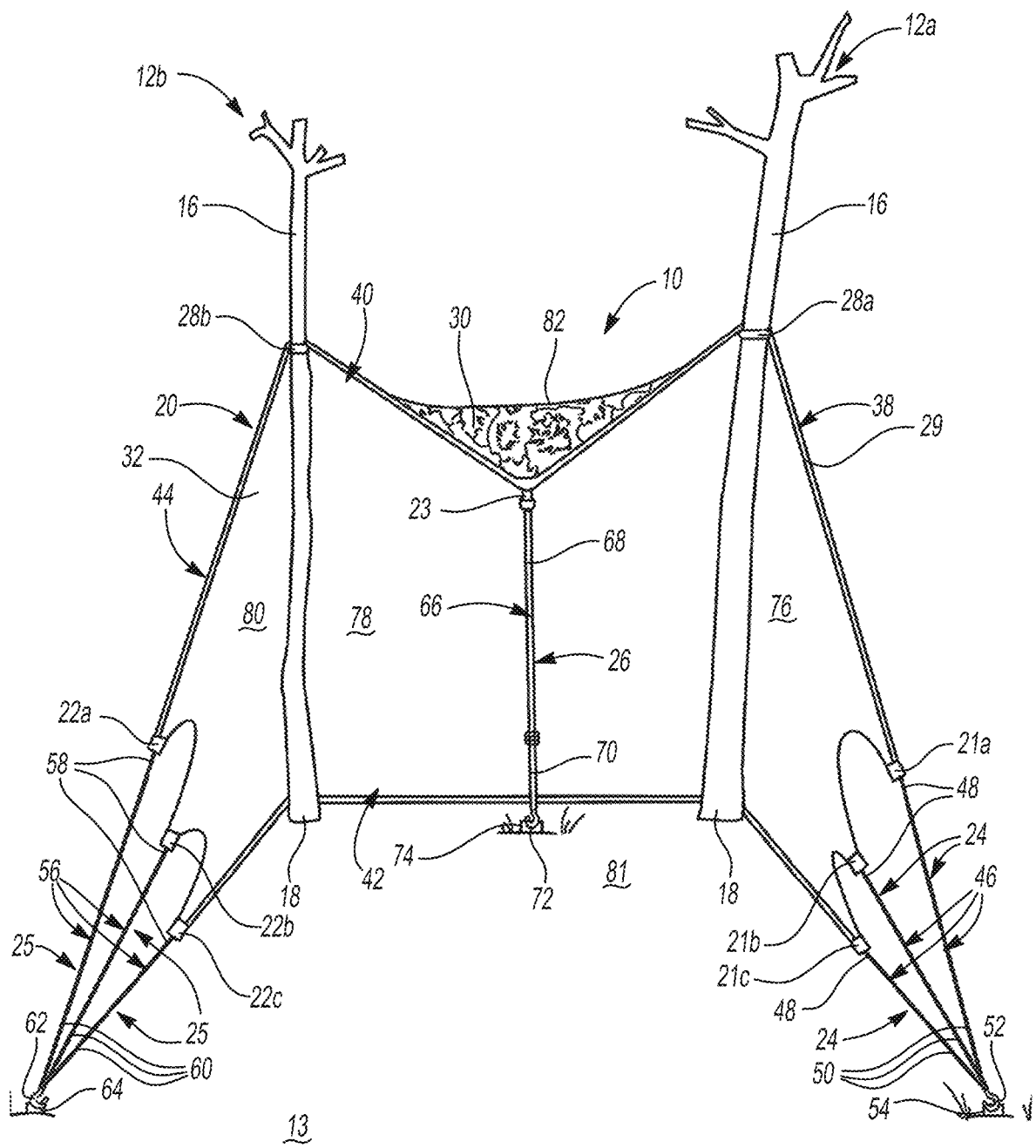
FIG. 4 is a back view of the assembly shown in FIG. 1 in the first position.

With continued reference to FIGS. 1-9, installation of the blind assembly 10 will be described in detail. The user 14 extends the first end 38 of the panel member 20 around the first support structure 12a and the catch mechanism 28a, and attaches the first hooking member 52 to the first stake 54. The user 14 then extends the second end 44 of the panel member 20 around the second support structure 12b and the catch mechanism 28b, and attaches the second hooking member 62 to the second stake 64. Once the first hooking member 52 and the second hooking member 62 are attached to the first and second stakes 54, 64, respectively, a first panel section 76, a second panel section 78 and a third panel section 80 are formed in the panel member 20. The first panel section 76 and the second panel section 78 are generally perpendicular to each other. The second panel section 78 and the third panel section 80 are also generally perpendicular to each other (FIG. 4). The first, second, and third panel sections 76, 78, 80 of the panel member 20 define an area 81 that conceals or hides the user 14. The hem 29 sewn into the periphery of the panel member 20 hooks onto the first and second catch mechanisms 28a, 28b attached to the first and second support structures 12a, 12b respectively (FIG. 4).

Figure 5:
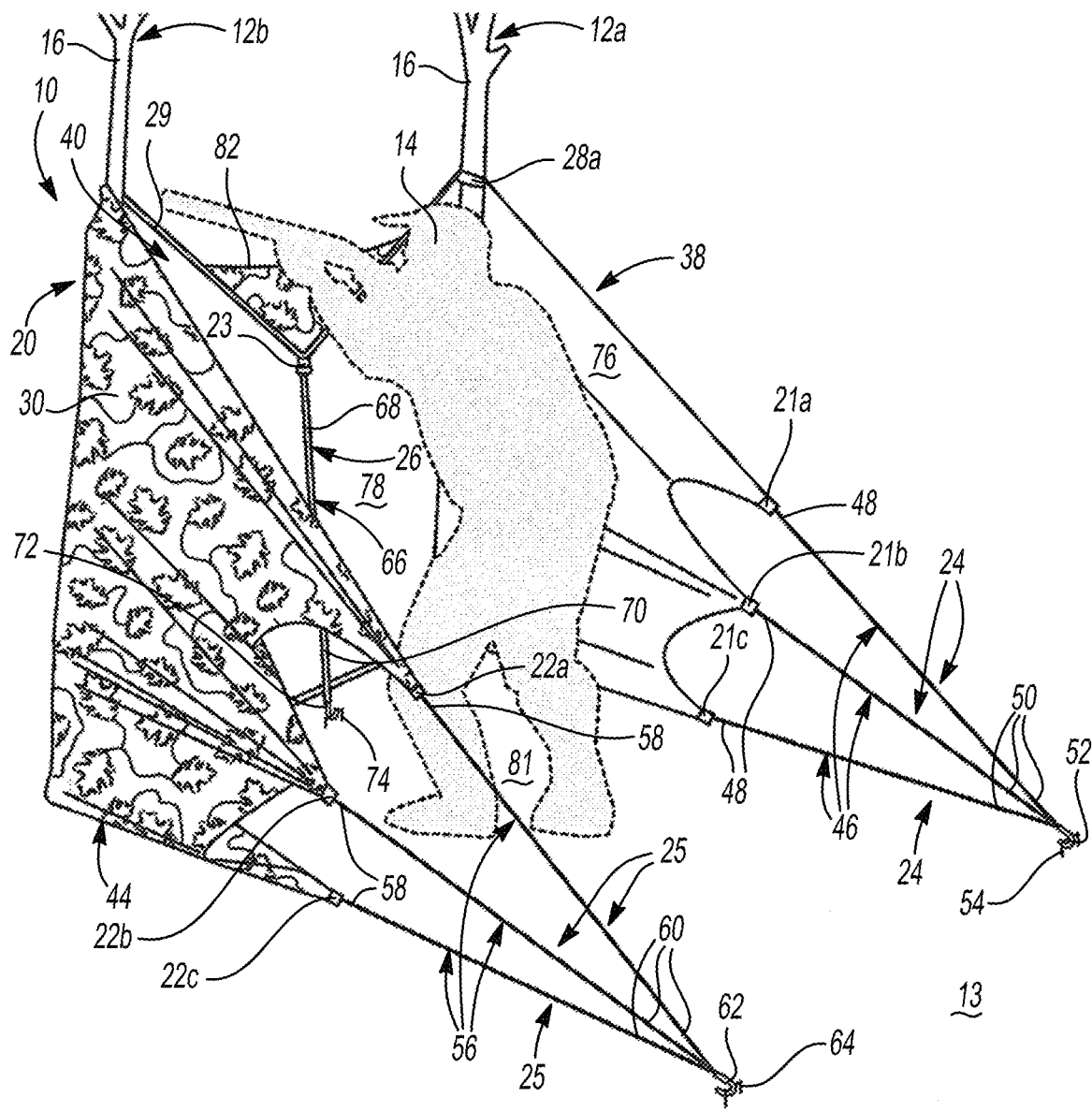
FIG. 5 is a side view of the blind assembly shown in FIG. 1 in the first position.
Figure 6:
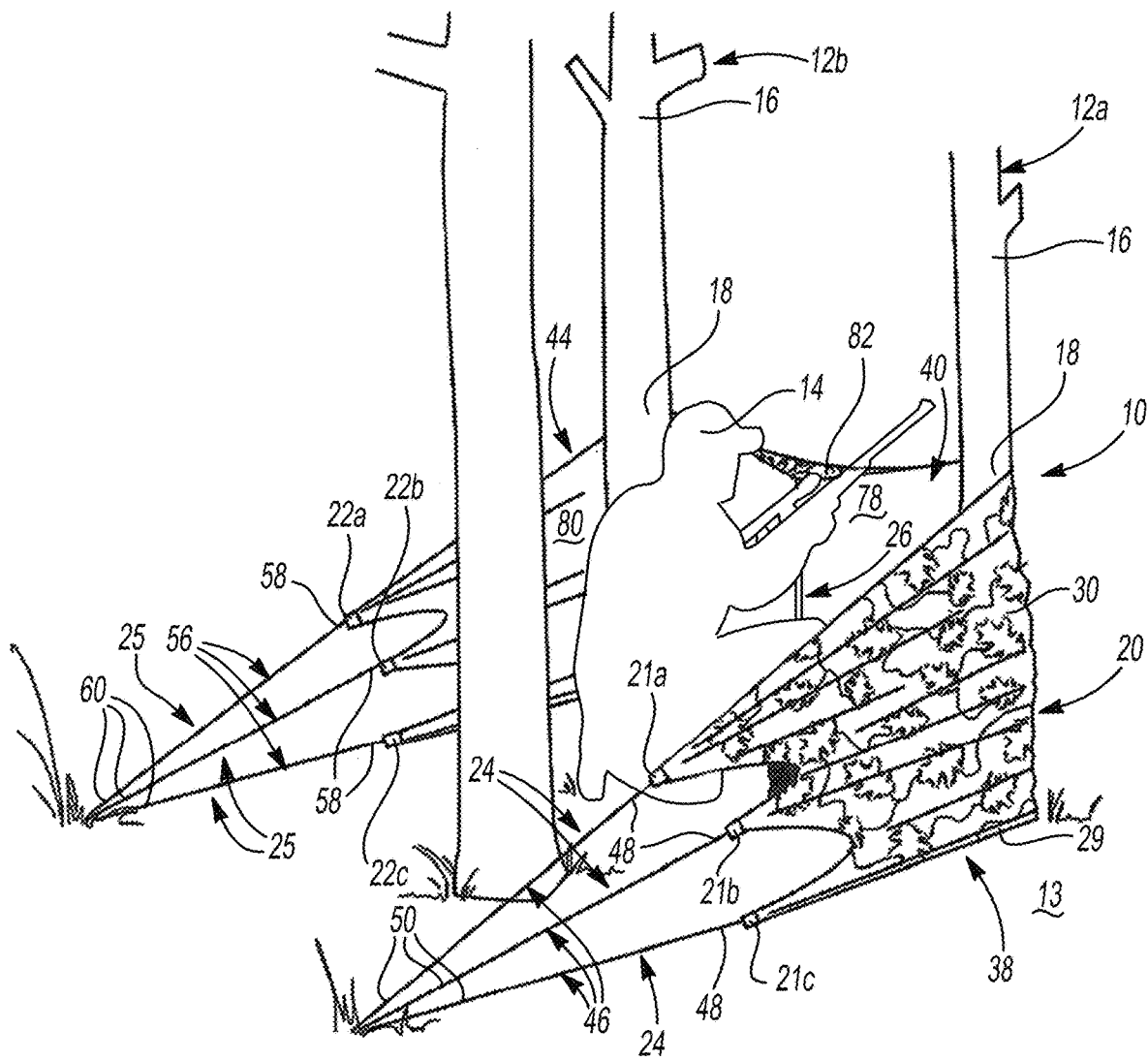
FIG. 6 is a side view of the blind assembly shown in FIG. 1 in a second position.

The user 14 then attaches the third hooking member 72 of the third cord 26 to the third stake 74 positioned in the ground surface 13 such that an arcuate pathway 82 is formed in the upper portion 40 of the panel member 20 (FIGS. 1, 4 and 5). The arcuate pathway 82 gives the natural appearance of the surveillance or hunting site and allows the user 14 to effectively surveil targets or hunt game animals. The third cord 26 adjusts when the panel member 20 is adjusted between a first position (FIGS. 1, 4 and 5) in which the panel member 20 is situated near the upper portion 16 of the first and second support structures 12a, 12b and a second position (FIG. 6) in which the panel member 20 is situated at or near the lower portion 18 of the first and second support structures 12a, 12b. The first position allows the user 14 to stand and may be used for hunting larger game animals such as deer, for example. The second position allows the user to knee or crouch and may be used for hunting smaller game animals. The panel member 20 is also adjustable to a plurality of positions between the first position and the second position for any surveillance situation.

It should be understood that the blind assembly 10 may be used for other applications such as bird watching, wildlife photography, and military applications, for example.

Figure 10:
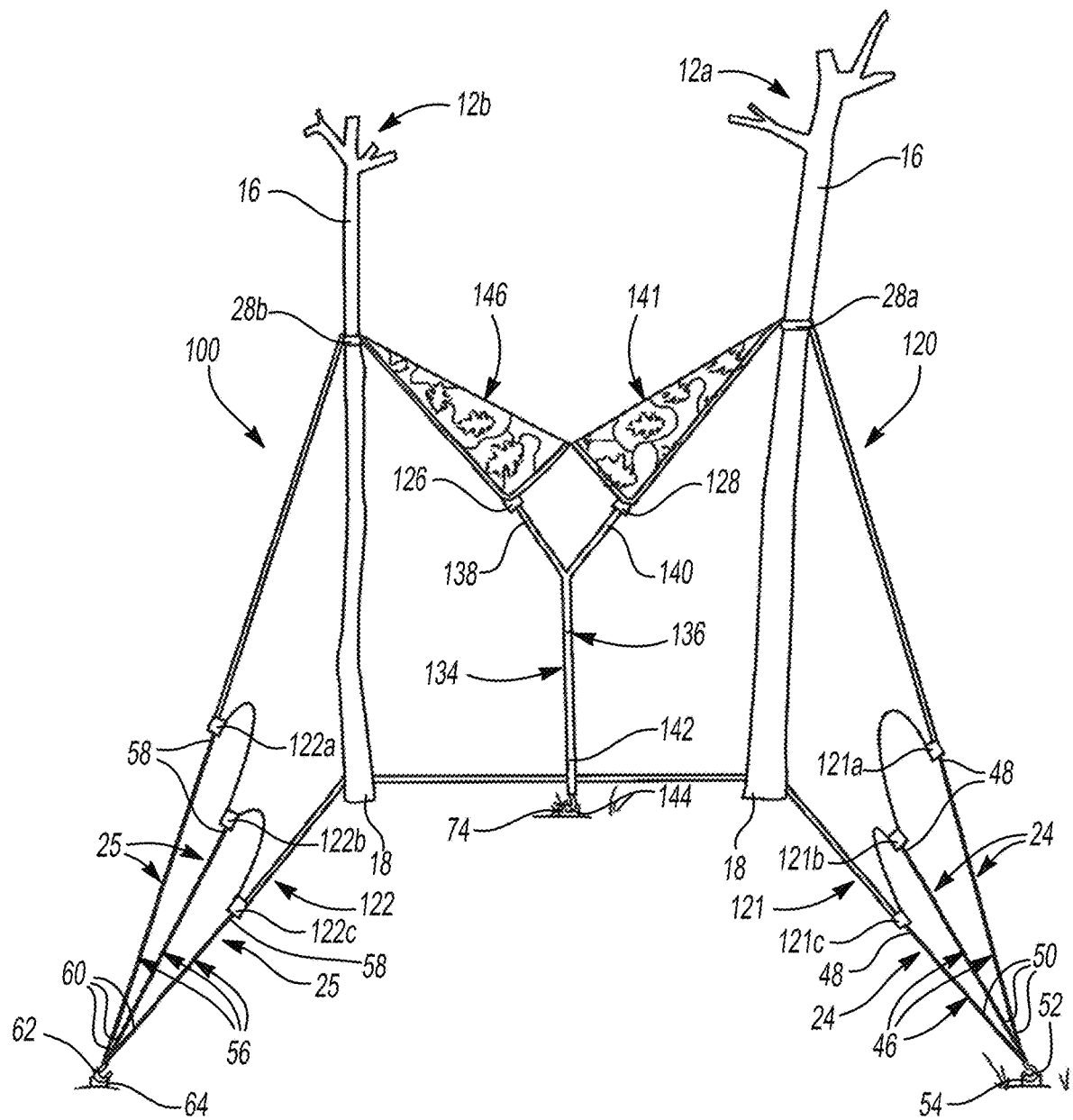
FIG. 10 is a back view of another blind assembly in a first position according to the principles of the present disclosure.

With reference to FIG. 10, another blind assembly 100 is provided. The structure and function of the blind assembly 100 may be similar or identical to the blind assembly 10 described above, apart from any exceptions described below.

As shown in FIG. 10, the blind assembly 100 may include a panel member 120, a plurality of first webbing loops 121, a plurality of second webbing loops 122, a third webbing loop or attachment member 126, a fourth webbing loop or attachment member 128, the plurality of first cords 24, the plurality of second cords 25, a third cord 134, and the pair of catch mechanisms 28.

The panel member 120 is similar in material, structure and function as the panel member 20 described above, and therefore, will not be described again in detail. The plurality of first and second webbing loops 121, 122 are similar in material, structure and function as the plurality of first and second webbing loops 21, 22, respectively, described above, and therefore, will not be described again in detail. The plurality of first and second webbing loops 121, 122 are attached to the panel member 120 in a similar manner as the first and second webbing loops 21, 22 attached to the panel member 20, as described above. The third webbing loop 126 may be made out of nylon material and attached (i.e., sewn) at an upper portion 141 of the panel member 120 between an upper webbing 121a of the webbing loops 121 and an upper webbing 122a of the second webbing loops 122. The fourth webbing loop 128 may be made out of nylon material and attached (i.e., sewn) at the upper portion 141 of the panel member 120 between the third webbing loop 126 and the upper webbing 121a of the first webbing loops 121.

The plurality of first and second cords 24, 25 are attached to the first and second webbing loops 121, 122 in a similar manner as the first and second cords 24, 25 attached to the first and second webbing loops 21, 22, as described above. The third cord 134 is Y-shaped and made out of an elastic material. The third cord 134 includes a body 136 having a first end 138, a second end 140 and a third end 142. The first end 138 is attached to the third webbing loop 126, the second end 140 is attached to the fourth webbing loop 128, and the third end 142 is integrally attached to a hooking member 144 that is configured to be coupled to the third U-shaped stake 74 positioned in the ground surface 13. In this way, a V-shaped pathway 146 is formed in the upper portion 141 of the panel member 120 when the user (not shown) couples the hooking member 144 to the third stake 74 positioned in the ground surface 13. This provides the benefit of concealing and/or camouflaging the user while surveilling a target or hunting game animals.

Figure 11:
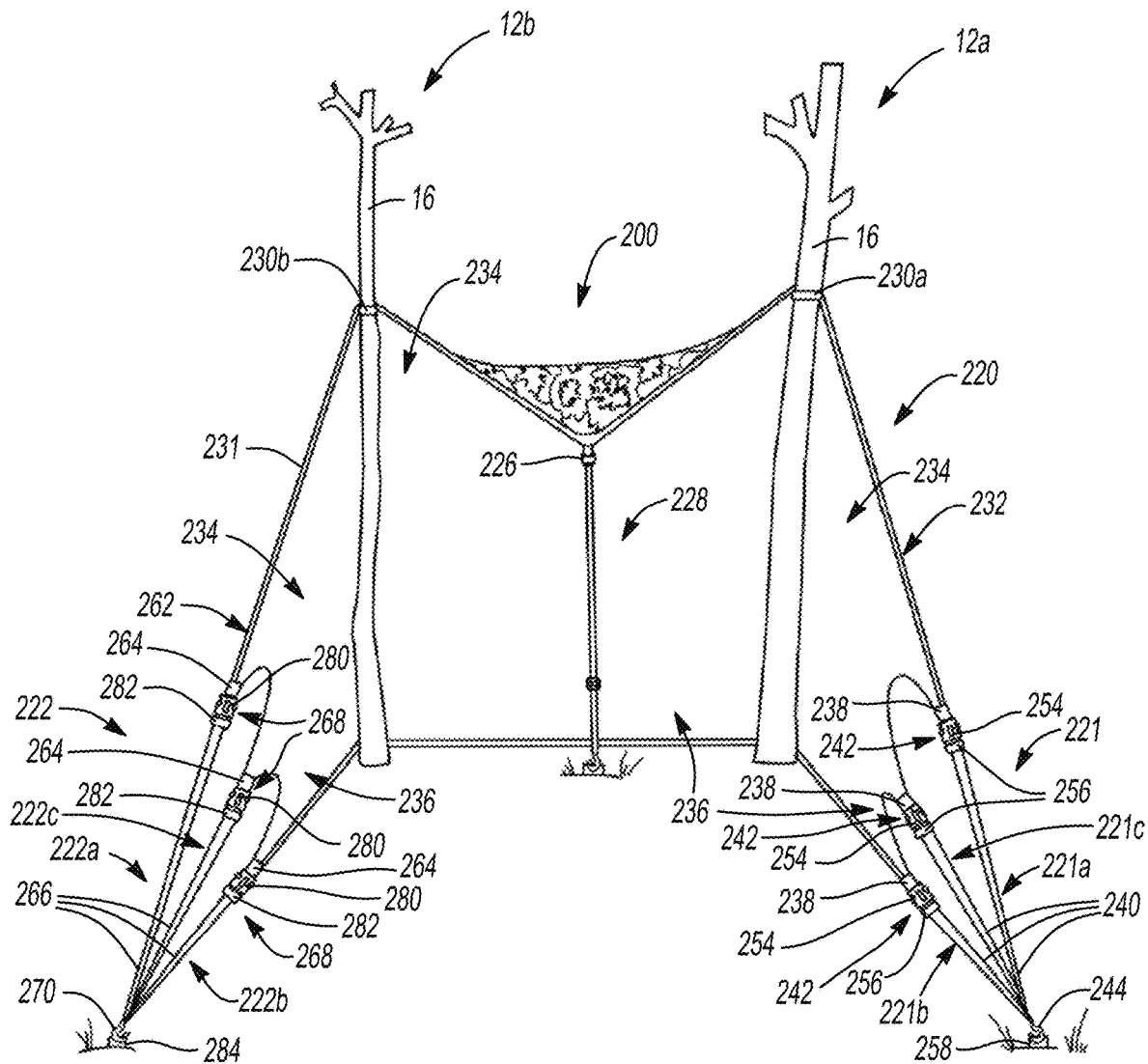
FIG. 11 is a back view of yet another blind assembly according to the principles of the present disclosure.

With reference to FIG. 11, another blind assembly 200 is provided. The structure and function of the blind assembly 200 may be similar or identical to the blind assemblies 10, 100 described above, apart from any exceptions described below.

As shown in FIG. 11, the blind assembly 200 may include a panel member 220, a plurality of first buckle assemblies 221, a plurality of second buckle assemblies 222, a first webbing loop or attachment member 226, a first cord 228, and a pair of catch mechanisms 230. The panel member 220 is similar in material and function as the panel members 20, 120 described above, and therefore, will not be described again in detail.

The plurality of first buckle assemblies 221 are attached (i.e., sewn) to a hem 231 at a first end 232 of the panel member 220. As shown in FIG. 11, the plurality of first buckle assemblies 221 include an upper first buckle assembly 221a, a lower first buckle assembly 221b, and an intermediate first buckle assembly 221c. The upper first buckle assembly 221a is positioned at an upper portion 234 of the panel member 220. The lower first buckle assembly 221b is positioned at a lower portion 236 of the panel member 220. The intermediate first buckle assembly 221c is positioned at an intermediate portion of the panel member 220 between the upper first buckle assembly 221a and the lower first buckle assembly 221b.

Each first buckle assembly 221a, 221b, 221c includes a first strap 238, a second strap 240, and a fastening mechanism 242. The first strap 238 is made out of a nylon material and is attached (i.e., sewn) to the hem 231 of the panel member 220 at one end and the fastening mechanism 242 at another end. The second strap 240 is made out of a nylon material and is attached to the fastening mechanism 242 at one end and a hooking member 244 at another end. The fastening mechanism 242 includes a female portion 254 and a male portion 256. The female portion 254 is attached to the another end of the first strap 238 and the male portion 256 is attached to the one end of the second strap 240. The male portion 256 is inserted into the female portion 254 such that the male portion 256 and the female portion 254 snap into engagement with each other. The hooking member 244 is configured to attach to a first U-shaped stake 258 positioned in a ground surface 260.

The plurality of second buckle assemblies 222 are attached (i.e., sewn) to the hem 231 at a second end 262 of the panel member 220. As shown in FIG. 11, the plurality of second buckle assemblies 222 include an upper second buckle assembly 222a, a lower second buckle assembly 222b, and an intermediate second buckle assembly 222c. The upper second buckle assembly 222a is positioned at the upper portion 234 of the panel member 220. The lower second buckle assembly 222b is positioned at the lower portion 236 of the panel member 220. The intermediate second buckle assembly 222c is positioned at the intermediate portion of the panel member 220 between the upper second buckle assembly 222a and the lower second buckle assembly 222b.

Each second buckle assembly 222a, 222b, 222c includes a first strap 264, a second strap 266, and a fastening mechanism 268. The first strap 264 is made out of a nylon material and is attached (i.e., sewn) to the hem 231 of the panel member 220 at one end and the fastening mechanism 268 at another end. The second strap 266 is made out of a nylon material and is attached to the fastening mechanism 268 at one end and a hooking member 270 at another end. The fastening mechanism 268 includes a female portion 280 and a male portion 282. The female portion 280 is attached to the another end of the first strap 264 and the male portion 282 is attached to the one end of the second strap 266. The male portion 282 is inserted into the female portion 280 such that the male portion 282 and the female portion 280 snap into engagement with each other. The hooking member 270 is configured to attach to a second U-shaped stake 284 positioned in the ground surface 260.

The first webbing loop 226 is similar in structure and function as the third webbing loop 23 described above, and therefore, will not be described again in detail. The first cord 228 is similar in structure and function as the third cord 26 described above, and therefore, will not be described again in detail. The pair of catch mechanisms 230 (constituting catch mechanism 230a and 230b) are similar in structure and function as the pair of catch mechanisms 28 described above, and therefore, will not be described again in detail.

Figure 12:
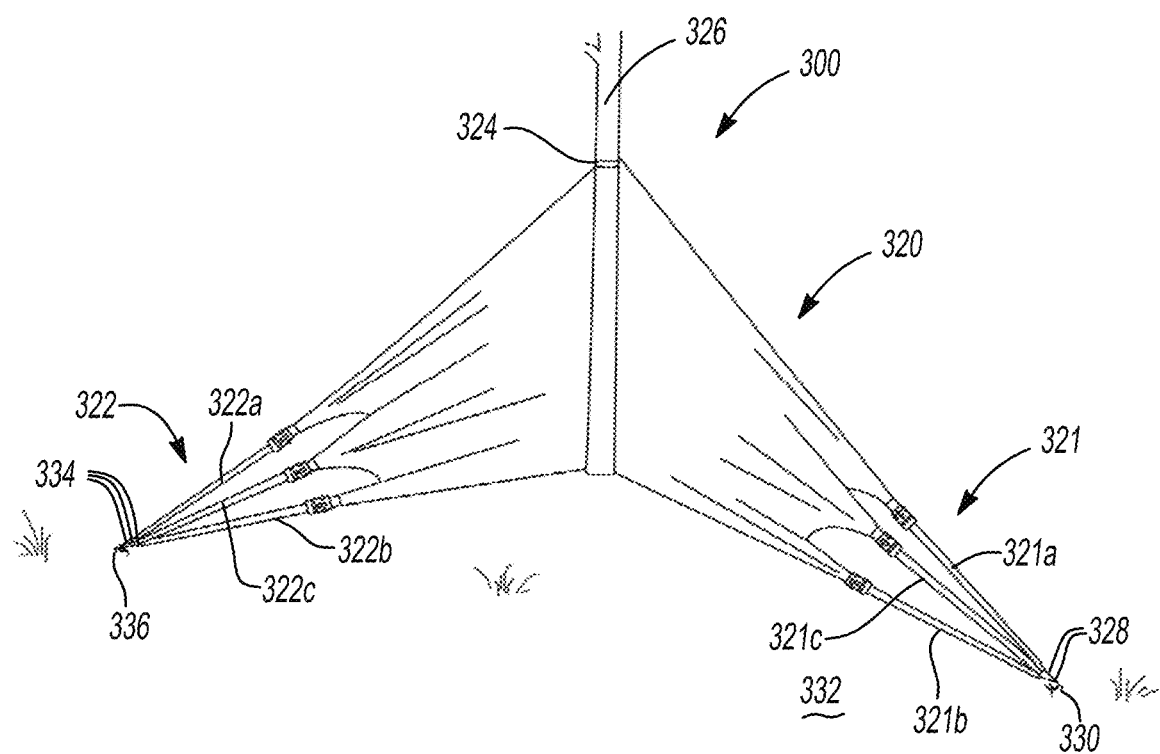
FIG. 12 is back view of yet another blind assembly according to the principles of the present disclosure and FIG. 13 is a side view of yet another blind assembly according to the principles of the present disclosure.

With reference to FIG. 12, another blind assembly 300 is provided. The structure and function of the blind assembly 300 may be similar or identical to the blind assembly 10, 100, 200 described above, apart from any exceptions described below.

The blind assembly 300 may include a panel member 320, a plurality of first buckle assemblies 321, a plurality of second buckle assemblies 322, and a catch mechanism 324. The panel member 320 maybe similar in material, structure and function as the panel members 20, 120, 220 described above, and therefore, will not be described again in detail. The plurality of first and second buckle assemblies 320, 321 may be similar in structure and function as the plurality of first and second buckle assemblies 221, 222, respectively, described above, and therefore, will not be described again in detail. The catch mechanism 324 may be similar in structure and function as the catch mechanism 28a, 28b, 230a, 230b, described above, and therefore, will not be described again in detail.

The panel member 320 extends around a support structure 326 and the catch mechanism 324 attached to the support structure 326 such that hooking members 328 from each first buckle assembly 321a, 321b, 321c attaches to a first U-shaped ground stake 330 positioned in a ground surface 332 and hooking members 334 from each second buckle assembly 322a, 322b, 322c attaches to a second U-shaped ground stake 336 positioned in the ground surface 332. It should be understood that a second catch mechanism (not shown) maybe included in the blind assembly 300 when the support structure 326 is of a larger diameter.

Figure 13:
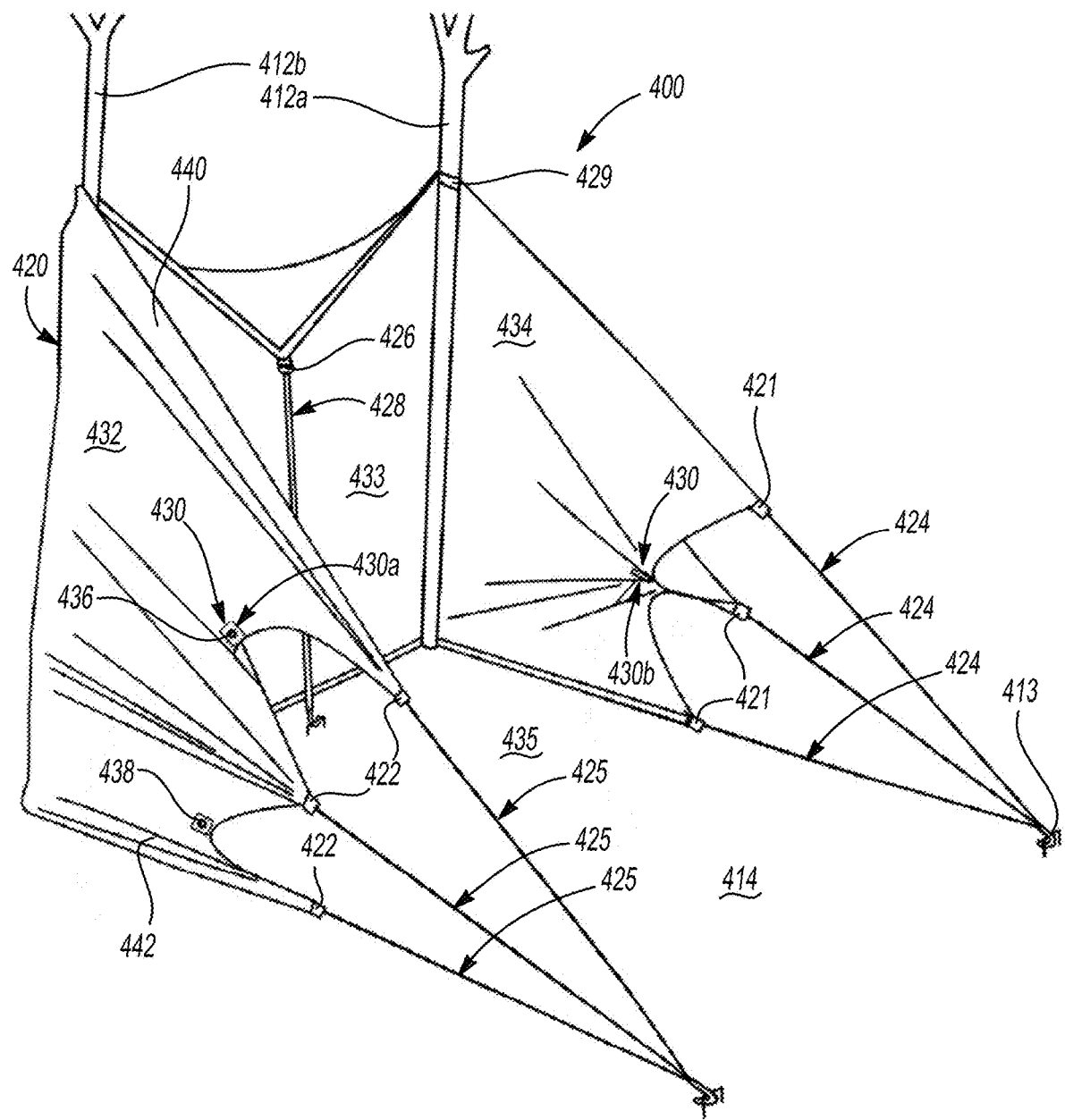

With reference to FIG. 13, another blind assembly 400 is provided. The structure and function of the blind assembly 400 may be similar or identical to the blind assembly 10, 100, 200, 300 described above, apart from any exception described below.

The blind assembly 400 may include a panel member 420, a plurality of first and second webbing loops 421, 422, a plurality of first and second cords 424, 425, a third webbing loop 426, a third cord 428, a pair of catch mechanisms 429 (only one shown in FIG. 13) and a pair of fastening members 430.

The panel member 420 may be similar in material, structure and function as the panel members 20, 120, 220, 320, described above, and therefore, will not be described again in detail. The structure and function of the plurality of first webbing loops 421 may be similar or identical to that of webbing loops 21, 121 described above, and therefore, will not be described again in detail. The structure and function of the plurality of second webbing loops 422 may be similar or identical to that of webbing loops 22, 122 described above, and therefore, will not be described again in detail.

The structure and function of the plurality of first and second cords 424, 425 may be similar or identical to that of first and second cords 24, 25, respectively, described above, and therefore, will not be described again in detail. The structure and function of the third webbing loop 426 may be similar or identical to that of webbing loops 23, 226 described above, and therefore, will not be described again in detail. The structure and function of the third cord 428 may be similar or identical to that of cords 26, 228, described above, and therefore, will not be described again in detail.

Once the panel member 420 is extended around a first support structure 412*a* and a second support structure 412*b* and secured to first and second stakes 413 (only one stake shown in FIG. 13) positioned in a ground surface 414, a first panel section 432, a second panel section 433 and a third panel section 434 are formed in the panel member 420. The first panel section 432 and the second panel section 433 are generally perpendicular to each other. The second panel section 433 and the third panel section 434 are also generally perpendicular to each other. The first, second, and third panel sections 432, 433, 434 of the panel member 20 define an area 435 that conceals or hides the user.

A first fastening member 430*a* of the pair of fastening members 430 is attached to the first panel section 432 of the panel member 420 and a second fastening member 430*b* of the pair of fastening members 430 is attached to the third panel section 434 of the panel member 420. Each fastening member 430*a*, 430*b* includes a first snap member 436 and a second snap member 438. The first snap member 436 is attached near an upper portion 440 of the panel member 420 and the second snap member 438 is attached near a lower portion 442 of the panel member 420. The first snap member 436 and the second snap member 438 may be fastened (i.e., snapped together as shown at the second fastening member 430*b* in FIG. 13) to reduce the amount of loose fabric from the first and third panel sections 432, 434 (i.e., increase the rigidity of the first and third panel sections 432, 434), thereby, eliminating excess fabric from blowing/moving in windy conditions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A blind assembly comprising:
a panel member having an upper portion;
an attachment member attached to the panel member at the upper portion; and
a first cord having a first end and a second end, the first end attached to the attachment member at the upper portion of the panel member and the second end configured to be attached to a first stake positioned in a ground surface;
a pair of catch mechanisms adjustable longitudinally along a corresponding support structure and configured to attach to the corresponding support structure,
wherein a pathway is formed at the upper portion of the panel member once the first end of the first cord is attached to the attachment member and the second end of the first cord is attached to the first stake.

2. The blind assembly of claim 1, further comprising a plurality of first webbings attached to a first end of the panel member and a plurality of second webbings attached to a second end of the panel member.

3. The blind assembly of claim 2, further comprising a plurality of second cords having a first end and a second end, the first end of the plurality of second cords attached to a corresponding first webbing of the plurality of first webbings and the second end of the plurality of second cords configured to be attached to a second stake positioned in the ground surface.

4. The blind assembly of claim 3, further comprising a plurality of third cords having a first end and a second end, the first end of the plurality of third cords attached to a corresponding second webbing of the plurality of second webbings and the second end of the plurality of third cords configured to be attached to a third stake positioned in the ground surface.

5. The blind assembly of claim 4, wherein the pathway formed at the upper portion of the panel member is arcuate.

6. The blind assembly of claim 5, wherein the panel member is adjustable between a first position and a second position.

7. The blind assembly of claim 6, wherein the panel member is adjustable to a plurality of positions between the first position and the second position.

8. The blind assembly of claim 1, wherein the panel member includes a hem that extends around a periphery thereof, and wherein the hem hooks onto the pair of catch mechanisms to facilitate the panel member grip with the support structures.

9. The blind assembly of claim 8, wherein the panel member is one of a spandex and an elastane material.

10. The blind assembly of claim 9, wherein the panel member is allowed to stretch to be 1% to 155% larger than its steady state size.

11. The blind assembly of claim 8, further comprising a rod attachment attached to the hem such that the rod attachment and the hem cooperate to form an opening that is configured to receive a hunting rod.

12. The blind assembly of claim 1, further comprising a plurality of first buckle assemblies attached to a first end of the panel member and a plurality of second buckle assemblies attached to a second end of the panel member, and wherein the plurality of first and second buckle assemblies are configured to be attached to second and third stakes, respectively, positioned in the ground surface.

13. The blind assembly of claim 1, wherein each catch mechanism includes a strap and a cam buckle.

14. A camouflage blind assembly comprising:
a pair of support structures;
a panel member extending around the pair of support structures, the panel member having an upper portion;
an attachment member attached to the panel member at the upper portion; and
a first cord having a first end and a second end, the first end attached to the attachment member at the upper portion of the panel member and the second end configured to be attached to a first stake positioned in a ground surface;
a pair of catch mechanisms adjustable longitudinally along a corresponding support structure and configured to attach to the corresponding support structure,
wherein the panel member is adjustable between a first position and a second position, and
wherein a pathway is formed at the upper portion of the panel member once the first end of the first cord is attached to the attachment member and the second end of the first cord is attached to the first stake.

15. The blind assembly of claim 14 further comprising a plurality of first webbings attached to a first end of the panel member and a plurality of second webbings attached to a second end of the panel member.

16. The blind assembly of claim 15, further comprising a plurality of second cords having a first end and a second end, the first end of the plurality of second cords attached to a corresponding first webbing of the plurality of first webbings and the second end of the plurality of second cords configured to be coupled to a second stake positioned in the ground surface.

17. The blind assembly of claim 16, further comprising a plurality of third cords having a first end and a second end, the first end of the plurality of third cords attached to a corresponding second webbing of the plurality of second webbings and the second end of the plurality of third cords configured to be coupled to a third stake positioned in the ground surface.

18. The blind assembly of claim 17, wherein the pathway formed at the upper portion of the panel member is arcuate.

19. The blind assembly of claim 18, wherein the panel member is adjustable to a plurality of positions between the first position and the second position.

20. The blind assembly of claim 19, wherein the panel member is one of a spandex and elastane material.

21. The blind assembly of claim 20, wherein the panel member is extended around the pair of support structures by stretching the panel member around the pair of support structures to facilitate grip between the panel member and the pair of support structures.

22. The blind assembly of claim 21, wherein the panel member assumes a natural shape of the pair of support structures once the panel member stretches around the pair of support structures.

23. The blind assembly of claim 22, wherein the panel member is allowed to stretch to be 1% to 155% larger than its steady state size.

24. The blind assembly of claim 14, wherein the panel member includes a hem that extends around a periphery thereof, and wherein the hem hooks onto the pair of catch mechanisms to facilitate the panel member grip with the support structures.

25. The blind assembly of claim 24, further comprising a rod attachment attached to the hem such that the rod attachment and the hem cooperate to form an opening that is configured to receive a hunting rod.

26. The blind assembly of claim 14, further comprising a plurality of first buckle assemblies attached to a first end of the panel member and a plurality of second buckle assemblies attached to a second end of the panel member, and wherein the plurality of first and second buckle assemblies are configured to be attached to second and third stakes positioned in the ground surface.

27. The blind assembly of claim 14, wherein the panel member is extended around the support structures to form a first panel section, a second panel section and a third panel section.

28. The blind assembly of claim 27, further comprising a first fastening member attached to the first panel section and a second fastening member attached to the third panel section, the first and second fastening members each including a first snap member and a second snap member.

29. The blind assembly of claim 28, wherein the first snap member is attached near an upper portion of the panel member and the second snap member is attached near a lower portion of the panel member, and wherein the first snap member is fastened to the second snap member to increase the rigidity of the first and third panel sections.

30. The blind assembly of claim 14, wherein each catch mechanism includes a strap and a cam buckle.

31. A blind assembly comprising:
a support structure;
a catch mechanism attached to and adjustable longitudinally along the support structure;
a panel member extending around the support structure and the catch mechanism; and
a plurality of first buckle assemblies attached to a first end of the panel member and a plurality of second buckle assemblies attached to a second end of the panel member, the plurality of first and second buckle assemblies are configured to be attached to first and second stakes positioned in a ground surface;
wherein the panel member is adjustable between a first position and a second position.

32. A method of installing a blind, the method comprising:
attaching a first end of a plurality of first cords to a first end of a panel member;
attaching a first end of a plurality of second cords to a second end of the panel member;
extending the first end of the panel member around a first support structure and coupling a second end of the plurality of first cords to a first stake positioned in a ground surface;
extending the second end of the panel member around a second support structure and coupling a second end of the plurality of second cords to a second stake positioned in the ground surface;
attaching a first end of a third cord to an attachment member attached at an upper portion of the panel member and coupling a second end of the third cord to a third stake positioned in the ground surface; and
setting the panel member to one of a first position and a second position.

33. The method of claim 32, wherein the panel member is one of a spandex and elastane material.

34. The method of claim 33, wherein a pathway is formed in the upper portion of the panel member once the second end of the third cord is attached to the third stake positioned in the ground surface.

* * * * *